(12) United States Patent
Lee et al.

(10) Patent No.: US 10,294,026 B1
(45) Date of Patent: May 21, 2019

(54) AUTOMATED WAREHOUSE STORAGE AND RETRIEVAL SYSTEM

(71) Applicants: Yi-Lung Lee, Taichung (TW); Tsair-Rong Chen, Changhua (TW); Chiung-Ying Huang, Changhua (TW); Shu-Ming Chen, Taichung (TW); Po-Hsuan Chen, Changhua (TW)

(72) Inventors: Yi-Lung Lee, Taichung (TW); Tsair-Rong Chen, Changhua (TW); Chiung-Ying Huang, Changhua (TW); Shu-Ming Chen, Taichung (TW); Po-Hsuan Chen, Changhua (TW)

(73) Assignees: Tera Autotech Corporation, Taichung (TW); Department of Electrical Engineering, National Changhua Univ. of Education, Changhua (TW)

( * ) Notice: Subject to any disclaimer, the term of this patent is extended or adjusted under 35 U.S.C. 154(b) by 0 days.

(21) Appl. No.: 15/940,840

(22) Filed: Mar. 29, 2018

(51) Int. Cl.
| | | |
|---|---|---|
| *B65G 1/04* | (2006.01) | |
| *B65G 1/06* | (2006.01) | |
| *B65G 1/137* | (2006.01) | |
| *G05D 1/02* | (2006.01) | |
| *G06Q 10/08* | (2012.01) | |
| *B65G 1/127* | (2006.01) | |

(52) U.S. Cl.
CPC ........... *B65G 1/0492* (2013.01); *B65G 1/065* (2013.01); *B65G 1/127* (2013.01); *B65G 1/137* (2013.01); *G05D 1/021* (2013.01); *G06Q 10/087* (2013.01); *G05D 2201/0216* (2013.01)

(58) Field of Classification Search
CPC .............................. B65G 1/0492; B65G 1/065
See application file for complete search history.

(56) References Cited

U.S. PATENT DOCUMENTS

| | | | | |
|---|---|---|---|---|
| 3,746,189 | A * | 7/1973 | Burch .................. | B65G 1/0428 414/273 |
| 4,007,843 | A * | 2/1977 | Lubbers ............... | B65G 1/0414 104/48 |
| 5,395,200 | A * | 3/1995 | Meier ....................... | B66F 9/07 212/196 |
| 2002/0146305 | A1* | 10/2002 | Haag ....................... | E04H 6/225 414/228 |
| 2013/0209203 | A1* | 8/2013 | Rafols .................. | B65G 1/0407 414/279 |

(Continued)

*Primary Examiner* — Thomas Randazzo
(74) *Attorney, Agent, or Firm* — Che-Yang Chen; Law Offices of Scott Warmuth (57) ABSTRACT

An automated warehouse storage and retrieval system may comprise at least an aisle, and each of two sides of the aisle has a shelf. A rail is laid along the aisle to enable at least an automated vehicle to move thereon. The automated vehicle has a platform, and a top surface thereof comprises at least a working station and at least a pick-and-place unit. Each of two lateral sides of the platform has two openings separated by a desired distance, and each of the openings has a climbing unit installed therein. The climbing units are configured to synchronously protrude from or move back in the openings. A side of the shelf faced to the rail has a plurality of vertical supporting members arranged in parallel, and each two adjacent supporting members are separated by the distance same as the two climbing units on the same lateral side of the platform.

6 Claims, 12 Drawing Sheets

(56) References Cited

U.S. PATENT DOCUMENTS

| | | | |
|---|---|---|---|
| 2014/0056672 A1* | 2/2014 | Mathys | B65G 1/0407 |
| | | | 414/277 |
| 2017/0121110 A1* | 5/2017 | Zombori | B65G 1/1375 |
| 2018/0086558 A1* | 3/2018 | Bergendorff | B65G 1/0414 |
| 2019/0071251 A1* | 3/2019 | Stefani | B25J 9/0084 |

* cited by examiner

AUTOMATED WAREHOUSE STORAGE AND RETRIEVAL SYSTEM

FIELD OF THE INVENTION

The present invention relates to an automated warehouse storage and retrieval system and more particularly to an automated warehouse storage and retrieval system that enables a plurality of automated vehicles to work at the same aisle.

BACKGROUND OF THE INVENTION

Figure 1:
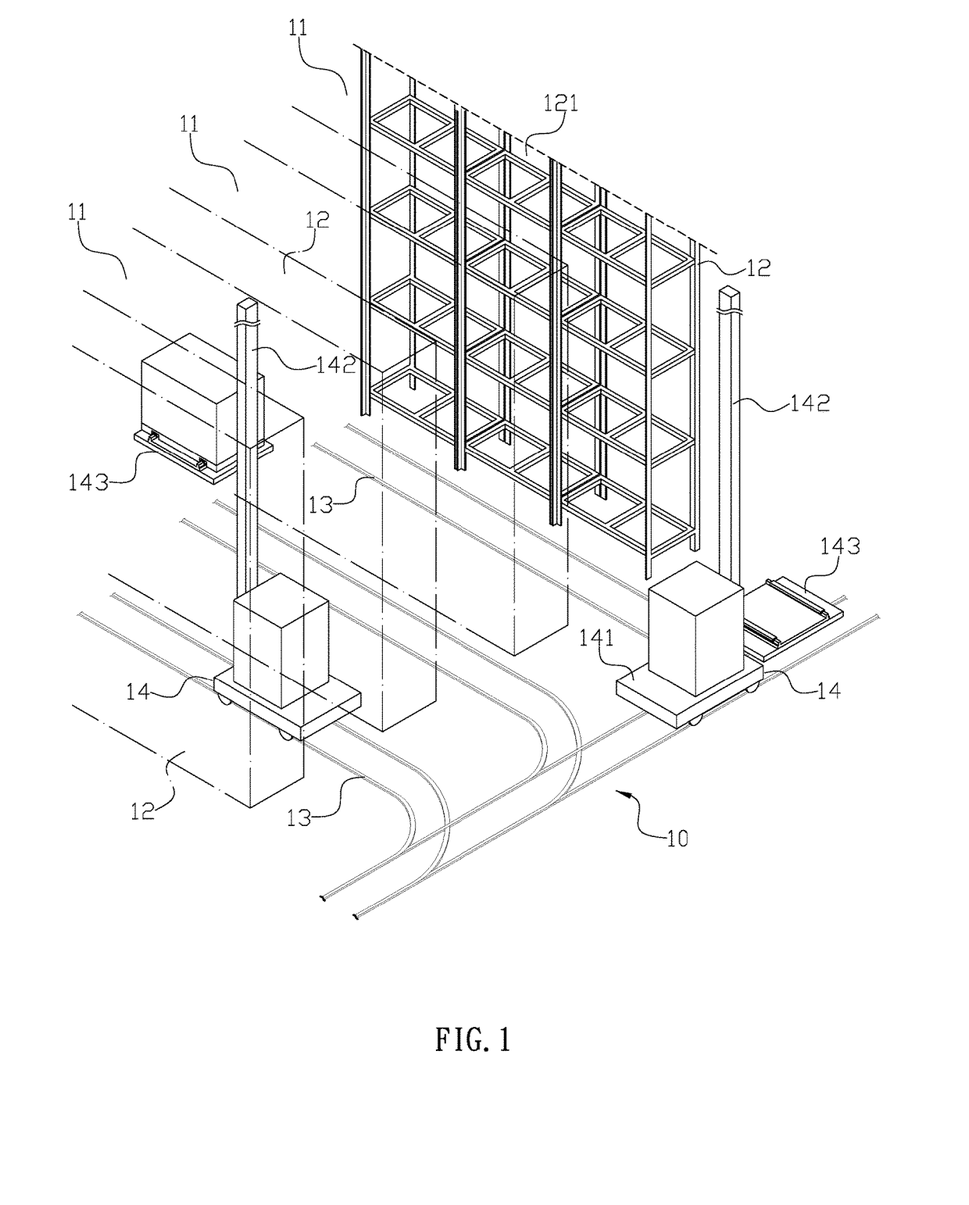
FIG. 1 is a prior art.
Figure 2:
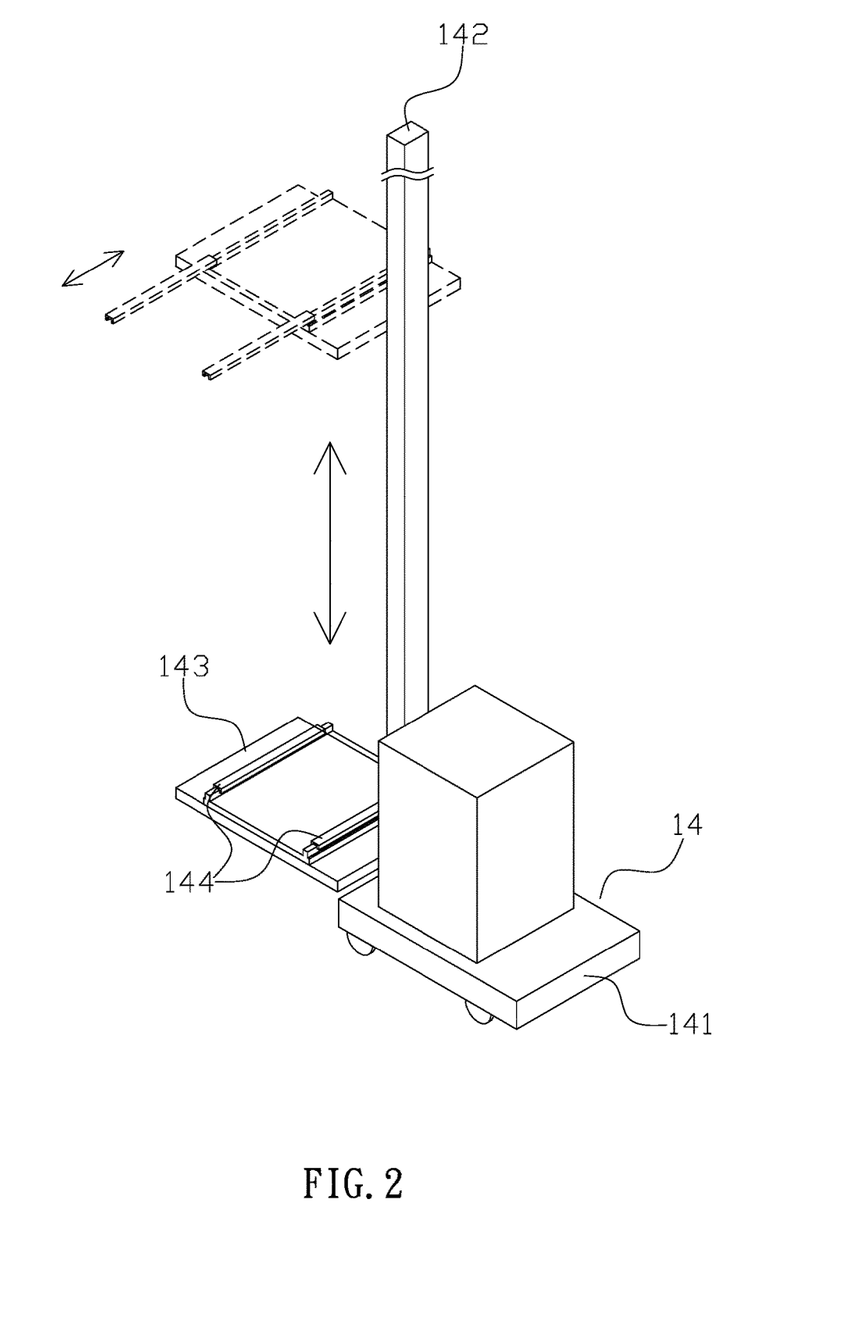
FIG. 2 is a prior art.

Referring to FIGS. 1 and 2, a conventional automated warehouse storage and retrieval system (10) comprises at least an aisle (11), and each of two sides of the aisle (11) has a plurality of storage shelves (12). Furthermore, the automated warehouse (10) has a rail (13) to enable an automated vehicle (14) to move thereon. In case that the automated warehouse (10) has a plurality of aisles (11), and the rails (13) are connected to enable the automated vehicle (14) to move between the aisles (11). In one embodiment, the automated vehicle (14) is a stacker comprising a base (141), an upright post (142), a working platform (143) and a pair of pallet forks (144). The upright post (142) is not lower than the height of the storage shelves (12), and the working platform (143) is configured to be raised or lowered along the upright post (142). Moreover, the pair of pallet forks (144) is adapted to be moved forward or backward to horizontally protrude from the working platform (143) or be retracted back on the working platform (143). In actual application, before stored in the warehouse, the goods are placed on a holding area, and through the rails (13) and the pallet forks (144), the automated vehicle (14) is configured to move the goods to designated storage spots (121) of the storage shelves (12) in the automated warehouse (10). Furthermore, the automated vehicle (14) also can move the goods stored on the shelves (12) out of the automated warehouse (10) for delivery of goods.

However, the conventional automated warehouse storage and retrieval system is disadvantageous because: (i) in order to pick or place goods on the shelves (12), the automated vehicle (14) needs to have the upright post (142) which is not lower than the height of the storage shelves (12), and in case that the system has two or more automated vehicles (14), because of the upright post (142), the aisle (11) cannot be shared by the automated vehicles (14), which makes the single aisle (11) can only be used by one automated vehicle (14), resulting in lowering the efficiency of goods handling; (ii) the long upright post (142) is not easy to be manufactured, maintained or secured on the base (141); and (iii) the automated vehicle (14) having many parts is bulky, which not only lowers the efficiency of goods handling but also costs more energy when operating. Therefore, there remains a need for a new and improved design for an automated warehouse storage and retrieval system to overcome the problems presented above.

SUMMARY OF THE INVENTION

The present invention provides an automated warehouse storage and retrieval system which comprises at least an aisle, and each of two sides of the aisle has a shelf. Moreover, a rail is laid along the aisle to enable at least an automated vehicle to move thereon. The automated vehicle has a platform, and a top surface of the platform comprises at least a working station and at least a pick-and-place unit thereon. Each of two lateral sides of the platform has two openings which are separated by a desired distance, and each of the openings has a climbing unit installed therein. Moreover, the climbing units are configured to be operated by a telescoping member to synchronously protrude from or move back in the openings. A side of the shelf faced to the rail has a plurality of vertical supporting members which are arranged in parallel, and each two adjacent supporting members are separated by the distance same as the two climbing units on the same lateral side of the platform. The automated vehicle is configured to move on the rail to a designated position, and the climbing units are pushed out from the openings by the telescoping member so as to respectively engage with the supporting members of the shelves at the two sides of the aisle. The climbing units are configured to upwardly or downwardly climb along the supporting members synchronously thereby raising the automated vehicle to a designated height or lowering the automated vehicle back to the rail.

Comparing with conventional automated warehouse storage and retrieval system, the present invention is advantageous because: (i) the present invention enables a plurality of automated vehicles to work at the same aisle, which improves the efficiency of warehouse works; (ii) without the upright post, the volume and weight of the automated vehicle are reduced, which enables the automated vehicle to work more efficiently thereby saving more energy; and (iii) the supporting members can be manufactured separately and be connected thereafter, which lowers the cost and is easy for maintenance.

BRIEF DESCRIPTION OF THE DRAWINGS

FIG. 8 is a schematic view illustrating two automated vehicles work at the same aisle and one automated vehicle climbs upwardly to enable another automated vehicle to pass through.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 3:
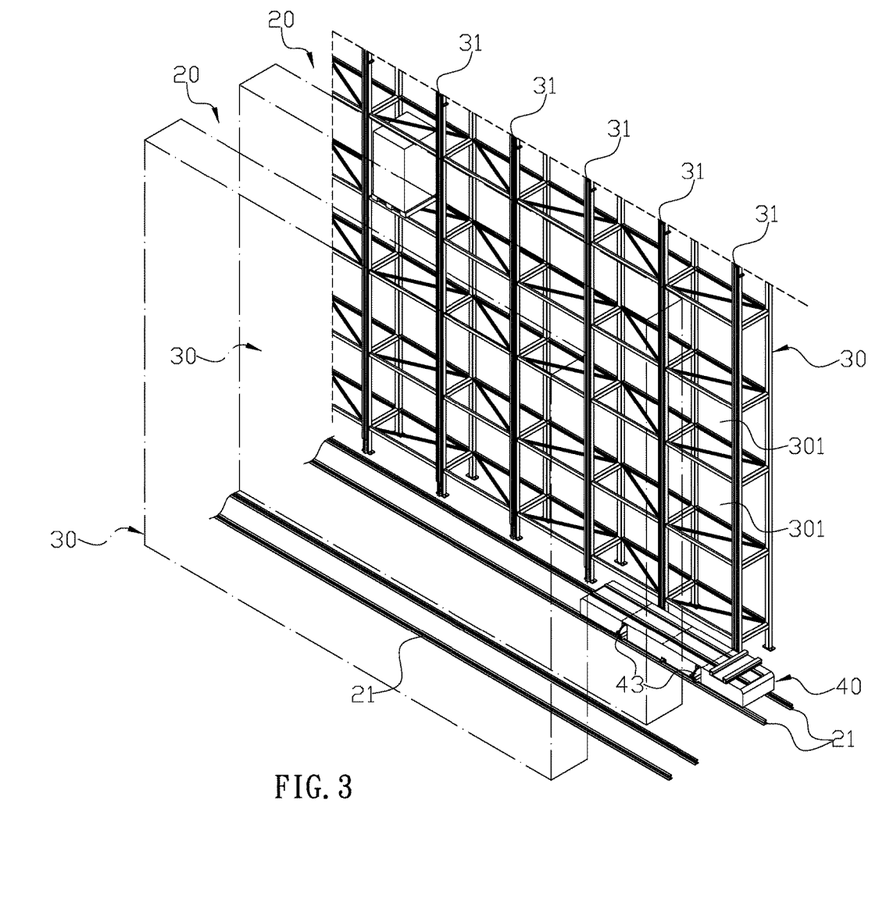
FIG. 3 is a three-dimensional assembly view of an automated warehouse storage and retrieval system of the present invention.
Figure 4:
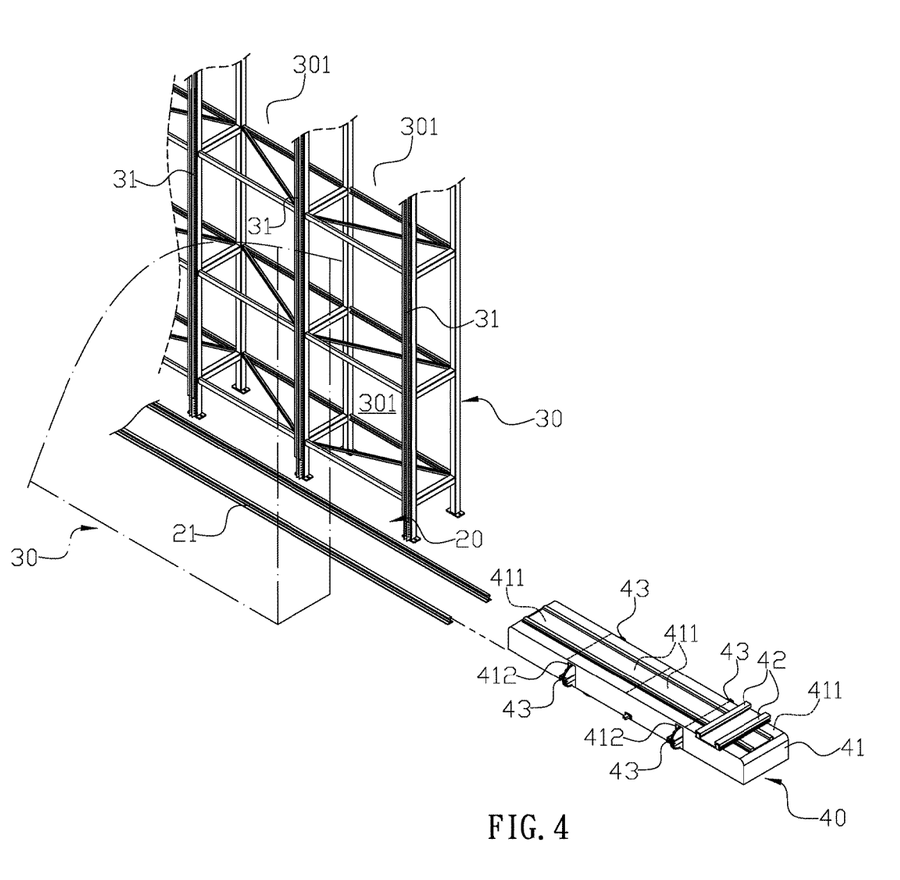
FIG. 4 is a three-dimensional exploded view of the automated warehouse storage and retrieval system of the present invention.
Figure 5:
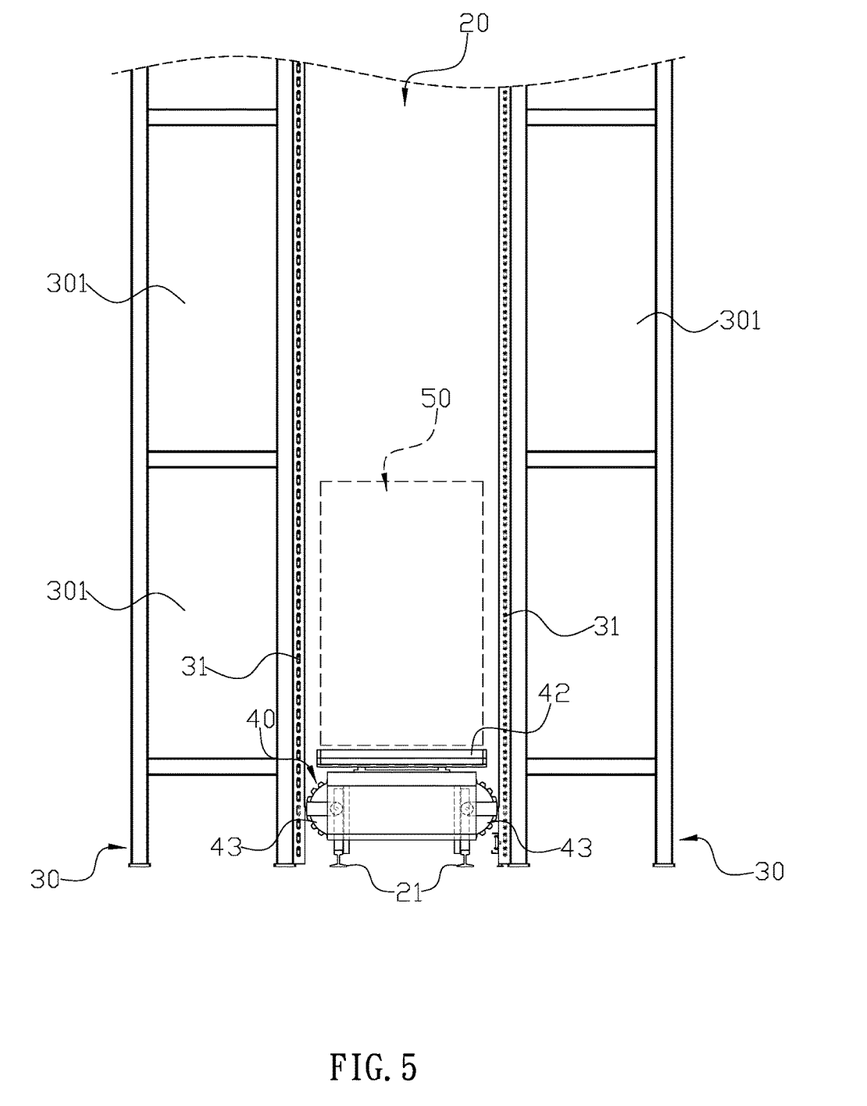
FIG. 5 is a plan view illustrating an automated vehicle moves along an aisle of the automated warehouse storage and retrieval system in the present invention.

In order to further understand the goal, characteristics and effect of the present invention, a number of embodiments along with the drawings are illustrated as following:

Referring to FIGS. 3 to 5, the present invention provides an automated warehouse storage and retrieval system which comprises at least an aisle (20), and each of two sides of the aisle (20) has a shelf (30). Moreover, a rail (21) is laid along the aisle (20) to enable at least an automated vehicle (40) to move thereon. The automated vehicle (40) has a platform (41), and a top surface of the platform (41) comprises at least a working station (411) and at least a pick-and-place unit (42) thereon. Each of two lateral sides of the platform (41) has two openings (412) which are separated by a desired distance, and each of the openings (412) has a climbing unit (43) installed therein. Moreover, the climbing units (43) are configured to be operated by a telescoping member to synchronously protrude from or move back in the openings (412). A side of the shelf (30) faced to the rail (21) has a plurality of vertical supporting members (31) which are arranged in parallel, and each two adjacent supporting members (31) are separated by the distance same as the two climbing units (43) on the same lateral side of the platform (41). The automated vehicle (40) is configured to move on the rail (21) to a designated position, and the climbing units (43) are pushed out from the openings (412) by the telescoping member so as to respectively engage with the supporting members (31) of the shelves (30) at the two sides of the aisle (20). The climbing units (43) are configured to upwardly or downwardly climb along the supporting members (31) synchronously thereby raising the automated vehicle (40) to a designated height or lowering the automated vehicle (40) back to the rail (21).

Figure 6:
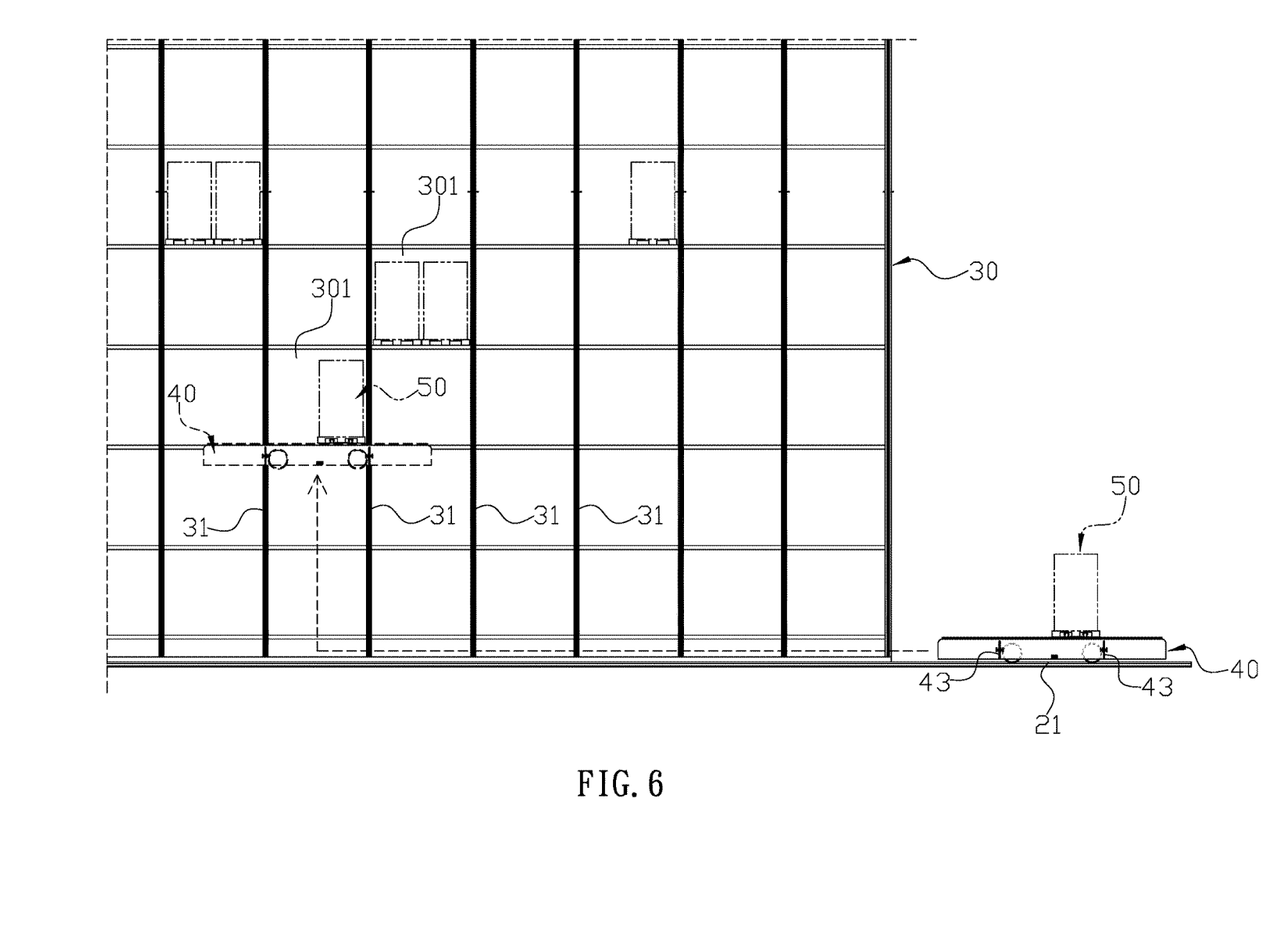
FIG. 6 is a schematic view illustrating the automated vehicle raises between two shelves of the automated warehouse storage and retrieval system in the present invention.
Figure 7:
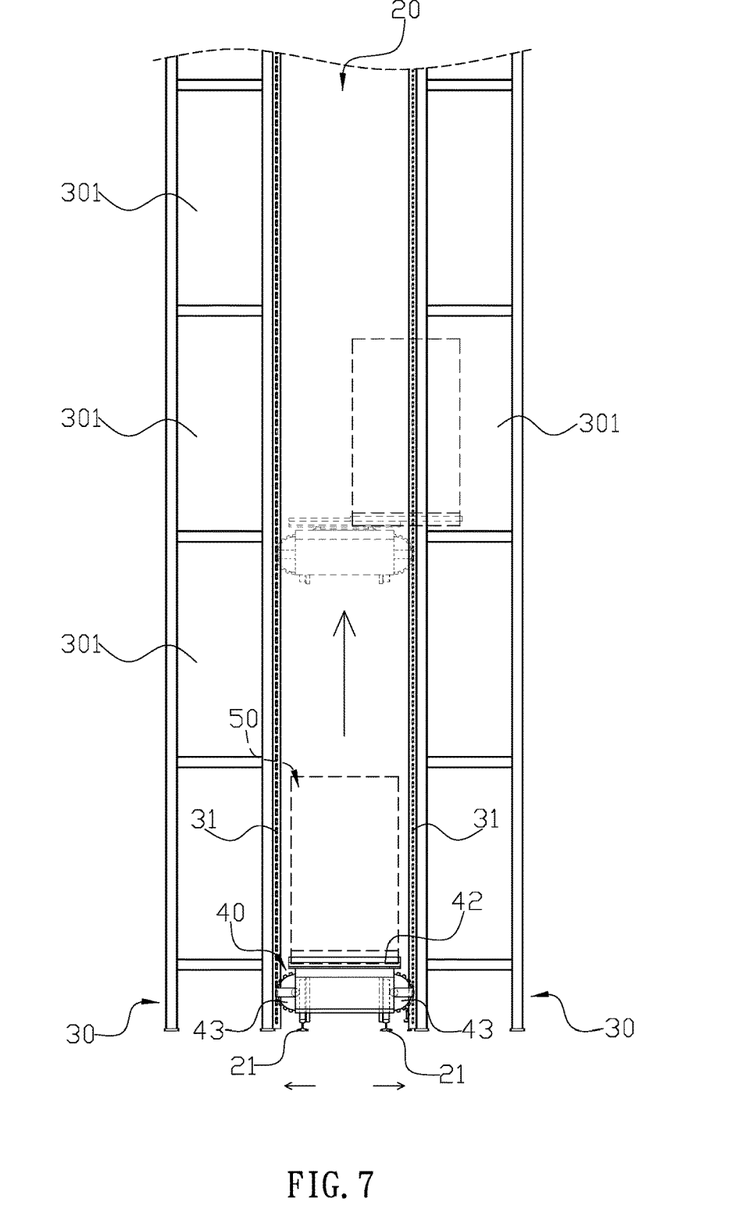
FIG. 7 is a schematic view illustrating the automated vehicle climbs upwardly after engaging with supporting members on the shelves of the automated warehouse storage and retrieval system in the present invention.

In actual application, before stored in the automated warehouse storage and retrieval system of the present invention, an article (50) to be warehoused is placed at a holding area which can be reached by the automated vehicle (40) through the rail (21), and the article (50) is adapted to be carried and placed by the automated vehicle (40) to a designated storage position (301) on the shelf (30). After picking the article (50) up, the automated vehicle (40) is configured to move along the rail (21) into the aisle (20) to reach a position aligned with a lower portion of the shelf (30) which is located right below the designated storage position (301). Thereafter, the climbing units (43) are adapted to protrude from the openings (412) to engage with and climb along the supporting members (31) of the two shelves (30) at two sides of the aisle (20) so as to raise the automated vehicle (40) to a height of the designated storage position (301), and the retractable pick-and-place unit (42) is adapted to carry and place the article (50) to the designated storage position (301) (as shown in FIGS. 6 and 7). After the article (50) is placed and the pick-and-place unit (42) is retracted, the climbing units (43) are adapted to rotate reversely and climb downwardly back to the rail (21), and the climbing units (43) are configured to be synchronously retracted back into the openings (412) by the telescoping member to detach from the supporting members (31) such that the automated vehicle (40) can move on the rail (21) again. Additionally, the automated vehicle (40) can also be used for moving the stored article (50) out of the warehouse of the present invention.

Figure 8:
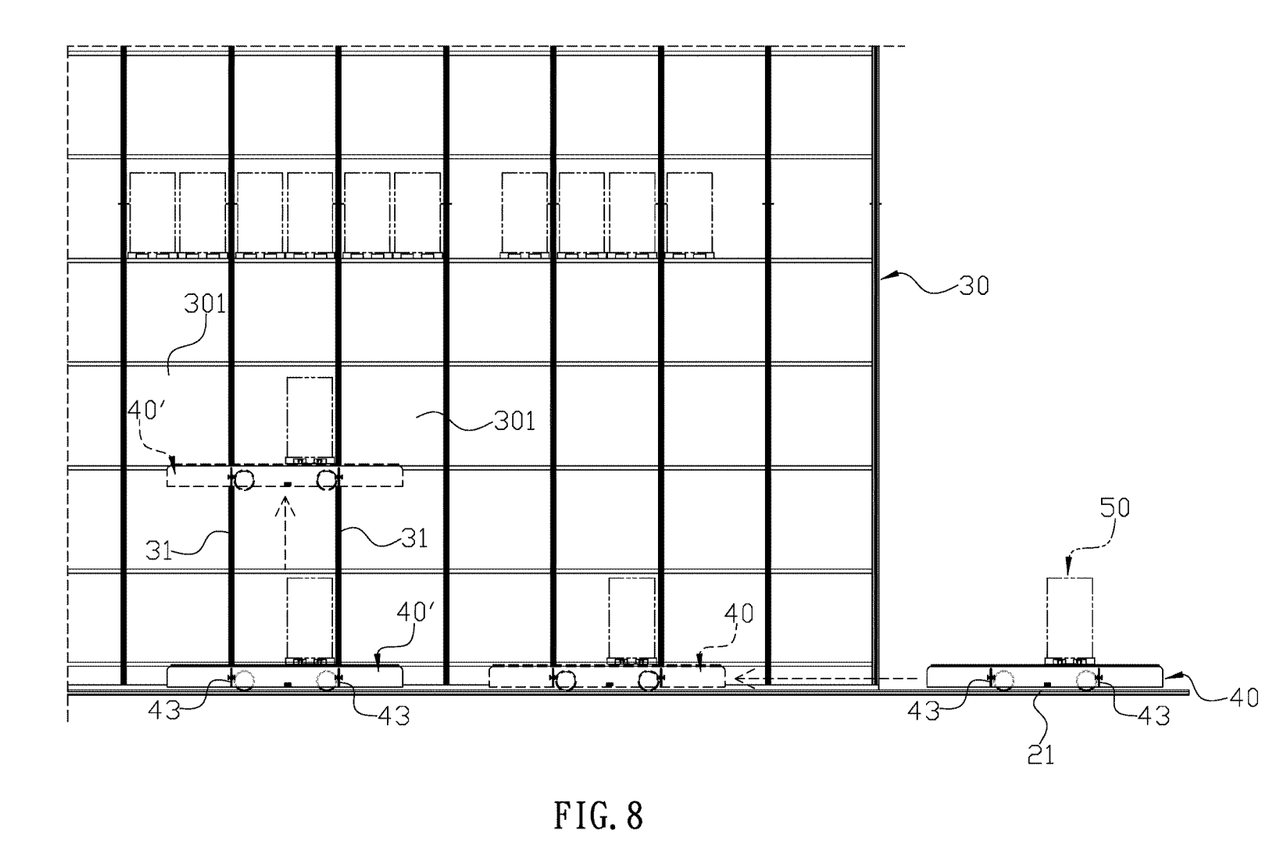
Figure 9:
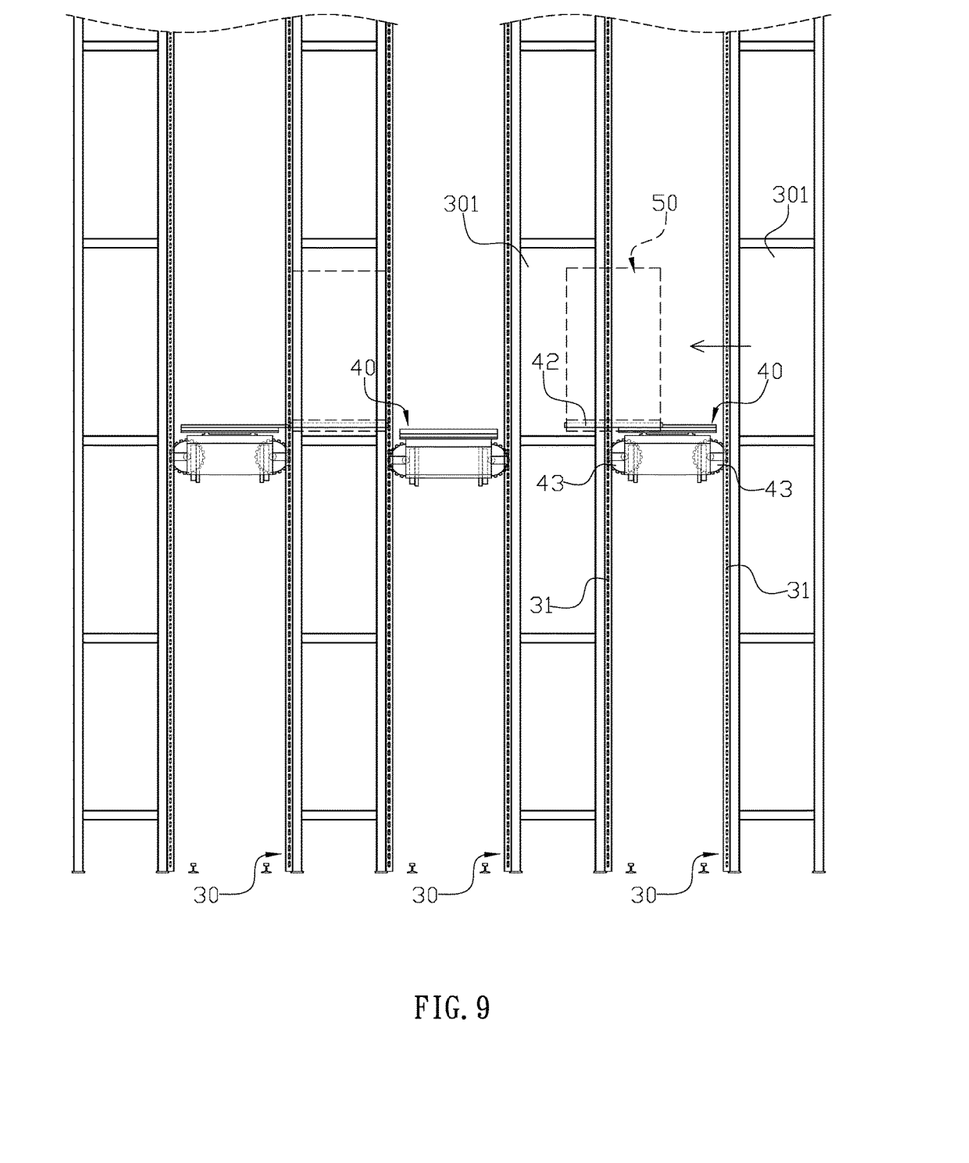
FIG. 9 is a schematic view illustrating an article placed on the shelf is directly and horizontally moved from one shelf to another in the present invention.

Since the automated vehicle (40) of the present invention has no upright post thereon, the single aisle (20) can be accessed by more than one automated vehicle (40) in the same time. In case that the present invention has two automated vehicles (40)(40'). When the two automated vehicle (40)(40') meet on the rails (21) between the shelves (30), one (40') of the automated vehicle (40)(40') can move upwardly through the climbing units (43) thereof to climb along the adjacent supporting members (31) of the shelves (30) to a preferable height, thereby enabling the other automated vehicle (40) to pass through toward a designated position (as shown in FIG. 8). As a result, the present invention can have a plurality of automated vehicles (40) working at the same aisle (20) to improve the efficiency of warehouse works. Moreover, since the automated vehicle (40) works between the shelves (30), through the pick-and-place unit (42) thereof, the automated vehicle (40) can directly and horizontally move the stored article (50) from one shelf (30) to another, thereby saving time and energy (as shown in FIG. 9).

In one embodiment, the automated warehouse storage and retrieval system comprises a plurality of aisles (20) which are connected, and the automated vehicle (40) is configured to travel between the aisles (20).

In another embodiment, each of the shelves (30) has a plurality of storage positions (301) arranged in a checkerboard pattern, and the vertical supporting members (31) are arranged at positions misaligned with the storage positions (301).

Figure 10:
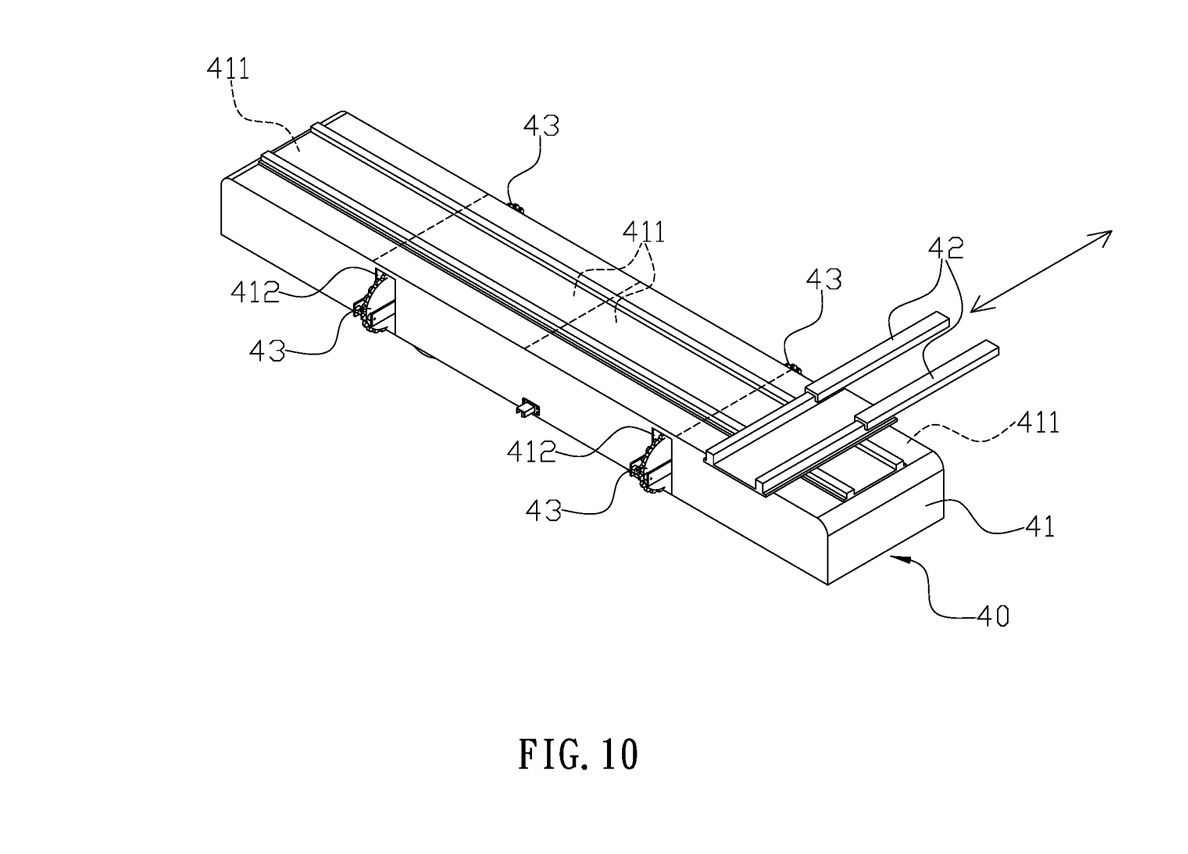
FIG. 10 is a schematic view illustrating a pick-and-place unit of the automated vehicle protrudes from a lateral side of the automated vehicle in the present invention.
Figure 11:
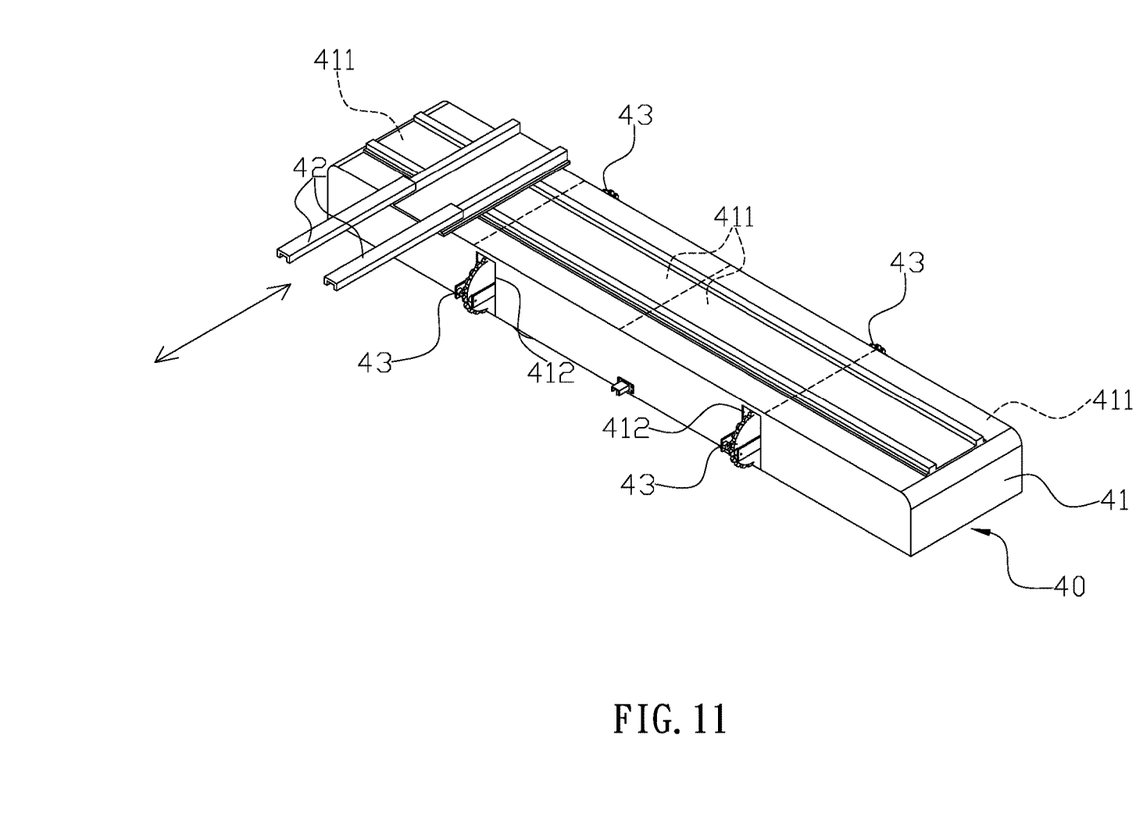
FIG. 11 is a schematic view illustrating the pick-and-place unit slides on a platform of the automated vehicle and protrudes from another lateral side of the automated vehicle of the present invention.

In still another embodiment, the platform (41) of the automated vehicle (40) has one pick-and-place unit (42) and four working stations (411) thereon, and the pick-and-place unit (42) is configured to slide on the platform (41) and stay on any of the working stations (411) which is favorable to pick the article (50) placed on the storage positions (31) of the shelf (30) or to place the article (50) to the designated storage position (31) of the shelf (30) (as shown in FIGS. 10 and 11).

Figure 12:
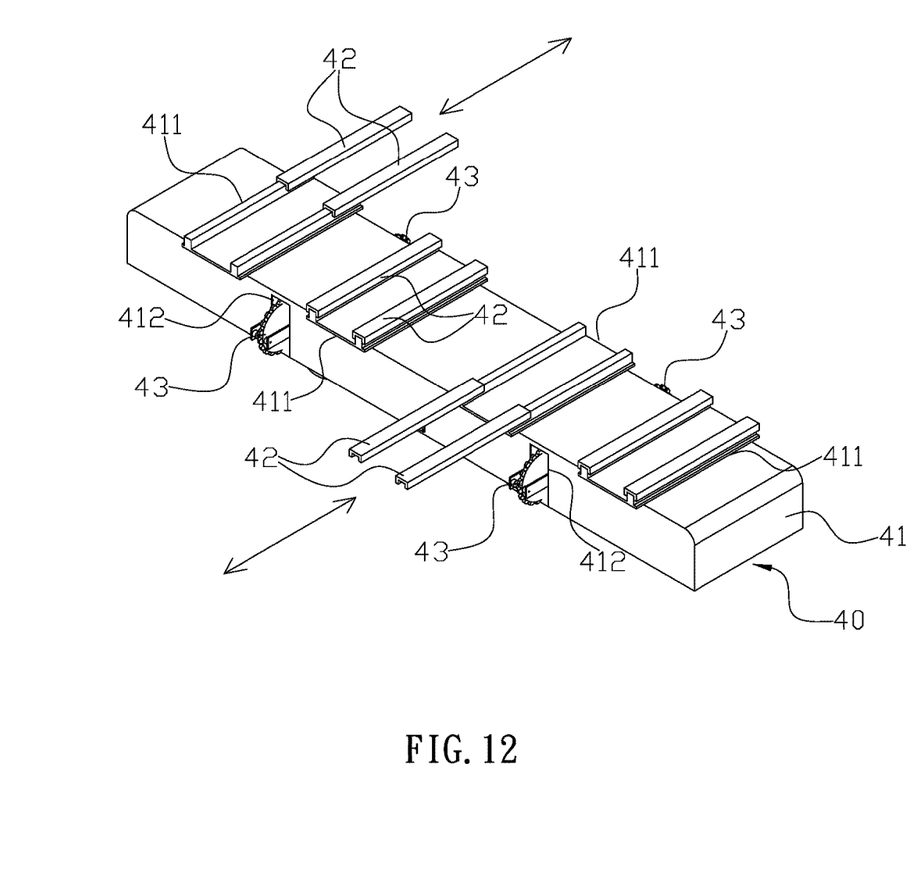
FIG. 12 is a three-dimensional assembly view of another embodiment of the automated vehicle in the present invention.

In a further embodiment, the platform (41) has four working stations (411), and each of the working stations (411) has one pick-and-place unit (42) thereon (as shown in FIG. 12).

In still a further embodiment, the pick-and-place unit (42) is a pair of pallet forks which is adapted to retractably protrude from a lateral side of the platform (41) (as shown in FIGS. 10 to 12).

Comparing with conventional automated warehouse storage and retrieval system, the present invention is advantageous because: (i) the present invention enables a plurality of automated vehicles (40) to work at the same aisle (20), which improves the efficiency of warehouse works; (ii) without the upright post, the volume and weight of the automated vehicle (40) are reduced, which enables the automated vehicle (40) to work more efficiently thereby saving more energy; and (iii) the supporting members (31) can be manufactured separately and be connected thereafter, which lowers the cost and is easy for maintenance.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An automated warehouse storage and retrieval system comprising
    at least an aisle, and
    each of two sides of the aisle having a shelf, and
    a rail laid along the aisle to enable at least an automated vehicle to move thereon;
    the automated vehicle having a platform, and
    a top surface of the platform comprising at least a working station and at least a pick-and-place unit thereon;
    each of two lateral sides of the platform having two openings which are separated by a desired distance, and
    each of the openings comprising a climbing unit installed therein, and
    the climbing units configured to be operated by a telescoping member to synchronously protrude from or move back in the openings;
    a side of the shelf, which is faced to the rail, having a plurality of vertical supporting members which are arranged in parallel, and
    each two adjacent supporting members separated by the distance same as the two climbing units on the same lateral side of the platform;
    the automated vehicle configured to move on the rail to a designated position, and the climbing units pushed out from the openings by the telescoping member so as to respectively engage with the supporting members of the shelves at the two sides of the aisle;
    the climbing units configured to upwardly or downwardly climb along the supporting members synchronously thereby raising the automated vehicle to a designated height or lowering the automated vehicle back to the rail.

2. The automated warehouse storage and retrieval system of claim 1, wherein the automated warehouse storage and retrieval system comprises a plurality of aisles which are connected, and the automated vehicle is configured to travel between the aisles.

3. The automated warehouse storage and retrieval system of claim 1, wherein each of the shelves has a plurality of storage positions arranged in a checkerboard pattern, and the vertical supporting members are arranged at positions misaligned with the storage positions.

4. The automated warehouse storage and retrieval system of claim 1, wherein the platform of the automated vehicle has one pick-and-place unit and four working stations thereon, and the pick-and-place unit is configured to slide on the platform and stay on any of the working stations which is favorable to pick the article placed on the storage position of the shelf or to place the article to the designated storage position of the shelf.

5. The automated warehouse storage and retrieval system of claim 1, wherein the platform has four working stations, and each of the working stations has one pick-and-place unit thereon.

6. The automated warehouse storage and retrieval system of claim 1, wherein the pick-and-place unit is a pair of pallet forks which is adapted to retractably protrude from a lateral side of the platform.

* * * * *